(12) United States Patent
Shalev

(10) Patent No.: US 9,382,119 B2
(45) Date of Patent: Jul. 5, 2016

(54) RAPID HIGH-PRESSURE MICROWAVE THERMAL DECOMPOSITION SYSTEM, CAPSULE AND METHOD FOR USING SAME

(71) Applicant: SO SPARK LTD., Herzeliya (IL)

(72) Inventor: Pinchas Shalev, Herzeliya (IL)

(73) Assignee: SO SPARK LTD., Herzeliya (IL)

( * ) Notice: Subject to any disclaimer, the term of this patent is extended or adjusted under 35 U.S.C. 154(b) by 0 days.

(21) Appl. No.: 14/605,170

(22) Filed: Jan. 26, 2015

(65) Prior Publication Data

US 2015/0210553 A1    Jul. 30, 2015

Related U.S. Application Data

(60) Provisional application No. 61/931,720, filed on Jan. 27, 2014.

(51) Int. Cl.
*C01B 31/20* (2006.01)
*B01J 19/12* (2006.01)
*A23L 2/54* (2006.01)

(52) U.S. Cl.
CPC . *C01B 31/20* (2013.01); *A23L 2/54* (2013.01); *B01J 19/126* (2013.01)

(58) Field of Classification Search
CPC ................................ B01J 19/126; C01B 31/12
USPC ........................................................ 422/186
See application file for complete search history.

(56) References Cited

U.S. PATENT DOCUMENTS

| 3,855,397 A | 12/1974 | Hoffman |
| 4,386,109 A * | 5/1983 | Bowen ................... A23F 5/262 219/689 |
| 4,636,337 A | 1/1987 | Gupta |
| 5,021,219 A | 6/1991 | Rudick |
| 5,182,084 A | 1/1993 | Plester |
| 5,192,513 A | 3/1993 | Stumphauzer |
| 5,350,587 A | 9/1994 | Plester |
| 5,936,499 A | 8/1999 | Eckels |
| 6,205,769 B1 * | 3/2001 | Brandenburg ............ F03H 1/00 60/203.1 |
| 6,426,111 B1 | 7/2002 | Hirsch |
| 2004/0022676 A1 | 2/2004 | Hamilton et al. |
| 2005/0155325 A1 | 7/2005 | Abercrombie |
| 2006/0169725 A1 | 8/2006 | Grill |

(Continued)

FOREIGN PATENT DOCUMENTS

| EP | 343 673 A1 | 11/1989 |
| GB | 323102 | 12/1929 |

(Continued)

OTHER PUBLICATIONS

Fowler, et al., The Little, Brown Handbook pp. 246-247 (11th Ed., Pearson Education, Inc. 2010).*

(Continued)

*Primary Examiner* — Daniel C McCracken
(74) *Attorney, Agent, or Firm* — Pearl Cohen Zedek Latzer Baratz LLP

(57) ABSTRACT

Carbon dioxide, such as may be used for a carbonated beverage, is produced by microwave thermal decomposition of a starting material. An apparatus for the process includes a microwave generator, a microwave chamber, a capsule received in the chamber containing starting material(s) and one or more channel(s) for recovering $CO_2$ generated in the process.

18 Claims, 18 Drawing Sheets

(56) References Cited

U.S. PATENT DOCUMENTS

| | | |
|---|---|---|
| 2006/0219739 A1 | 10/2006 | Crisp, III et al. |
| 2007/0062115 A1 | 3/2007 | Berry |
| 2009/0057302 A1 | 3/2009 | Ben-Shmuel |
| 2009/0069925 A1 | 3/2009 | Dattolo et al. |
| 2011/0031208 A1 | 2/2011 | Golden |
| 2011/0033584 A1 | 2/2011 | Bilchinsky |
| 2011/0174156 A1 | 7/2011 | Saunders |
| 2011/0226343 A1 | 9/2011 | Novak |
| 2013/0129870 A1 | 5/2013 | Novak et al. |
| 2014/0065266 A1 | 3/2014 | Shalev |

FOREIGN PATENT DOCUMENTS

| | | |
|---|---|---|
| GB | 2477376 | 8/2011 |
| WO | WO 94/10860 | 5/1994 |
| WO | WO 2007/096878 | 8/2007 |
| WO | WO 2008/007368 | 1/2008 |
| WO | WO 2009/104191 | 8/2009 |
| WO | WO 2010/052724 | 5/2010 |
| WO | WO 2011/094677 | 8/2011 |
| WO | WO 2012/076863 | 6/2012 |
| WO | WO 2012/103112 | 8/2012 |
| WO | WO 2013/070095 | 5/2013 |
| WO | WO 2014/006510 | 1/2014 |
| WO | WO 2014/033705 | 3/2014 |

OTHER PUBLICATIONS

Search Report of International Appl. No. PCT/IL2015/050094 mailed on Jul. 30, 2015.

Office Action of U.S. Appl. No. 13/685,050 mailed on Oct. 2, 2015.

"The chemical formula for sodium bicarbonate" obtained from https://answers.yahoo.com/question/index?qid =20080923132028, Date Sep. 23, 2008, pp. 2.

Search Report of International Application No. PCT/2013/050699 mailed on Mar. 25, 2014.

European Search Report for Appl. No. EP13833415.6 dated May 11, 2016.

* cited by examiner

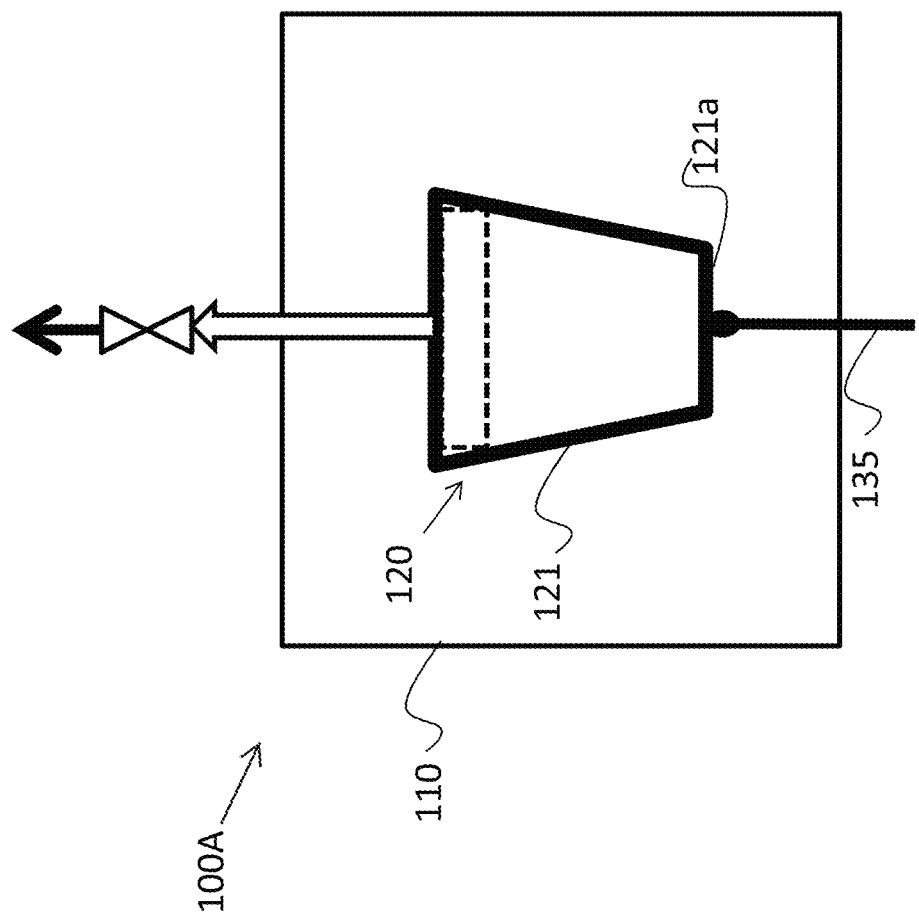

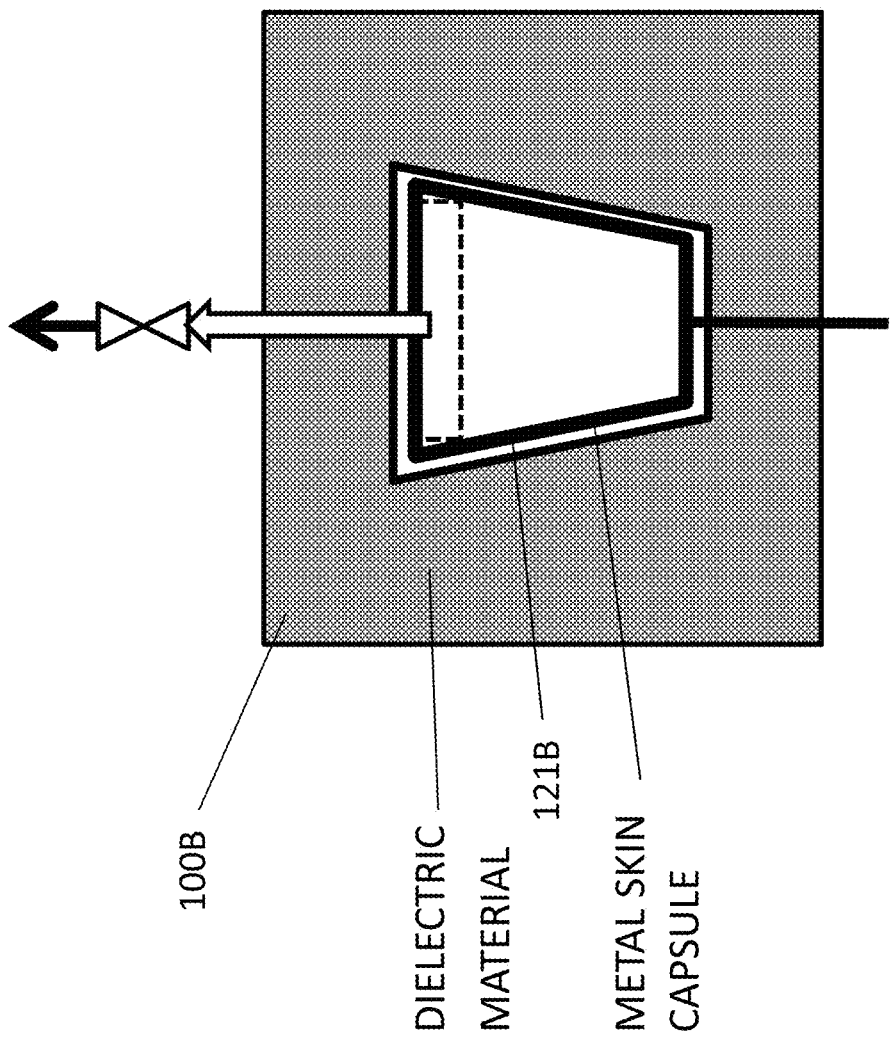

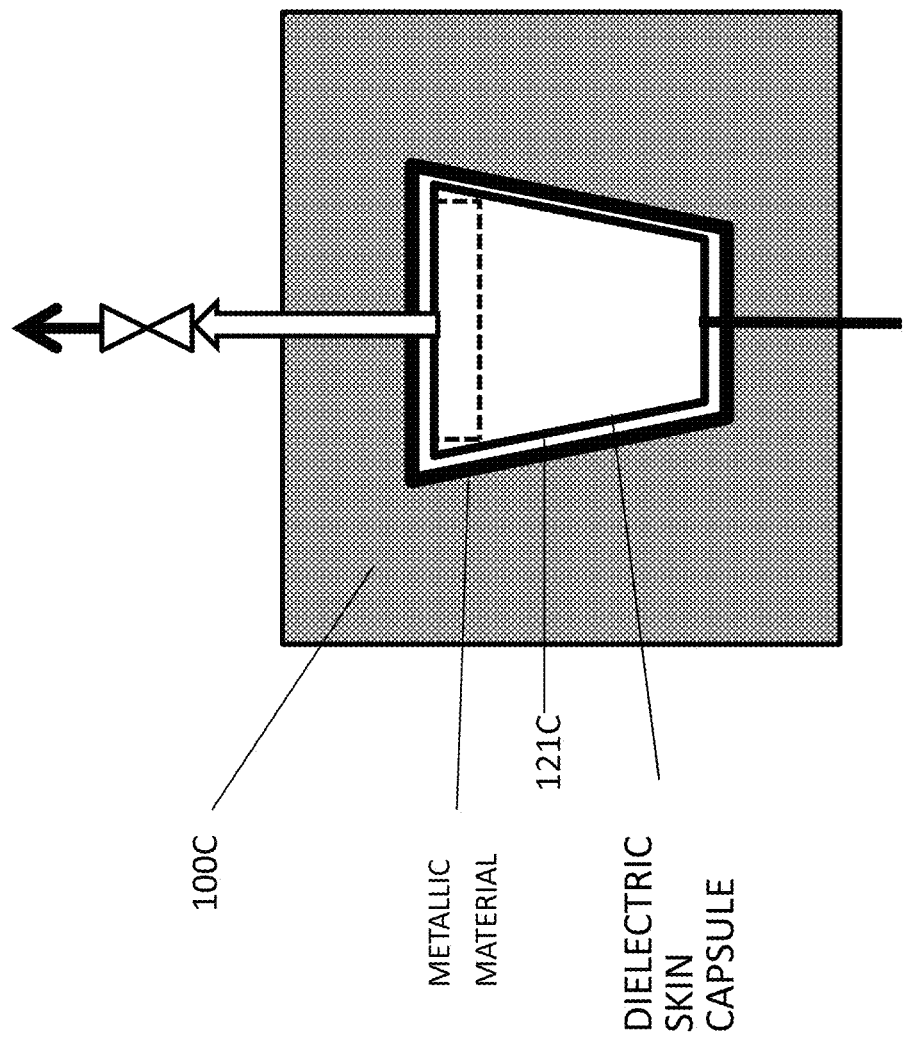

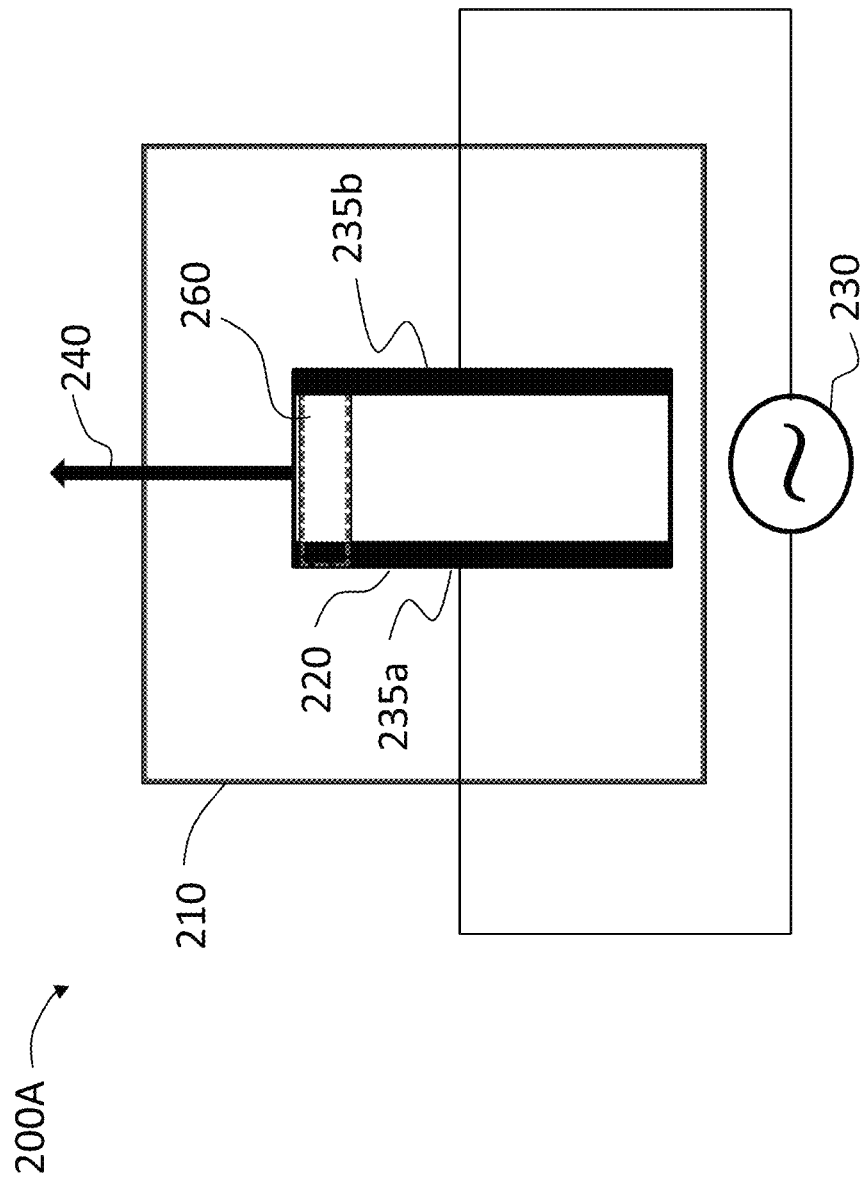

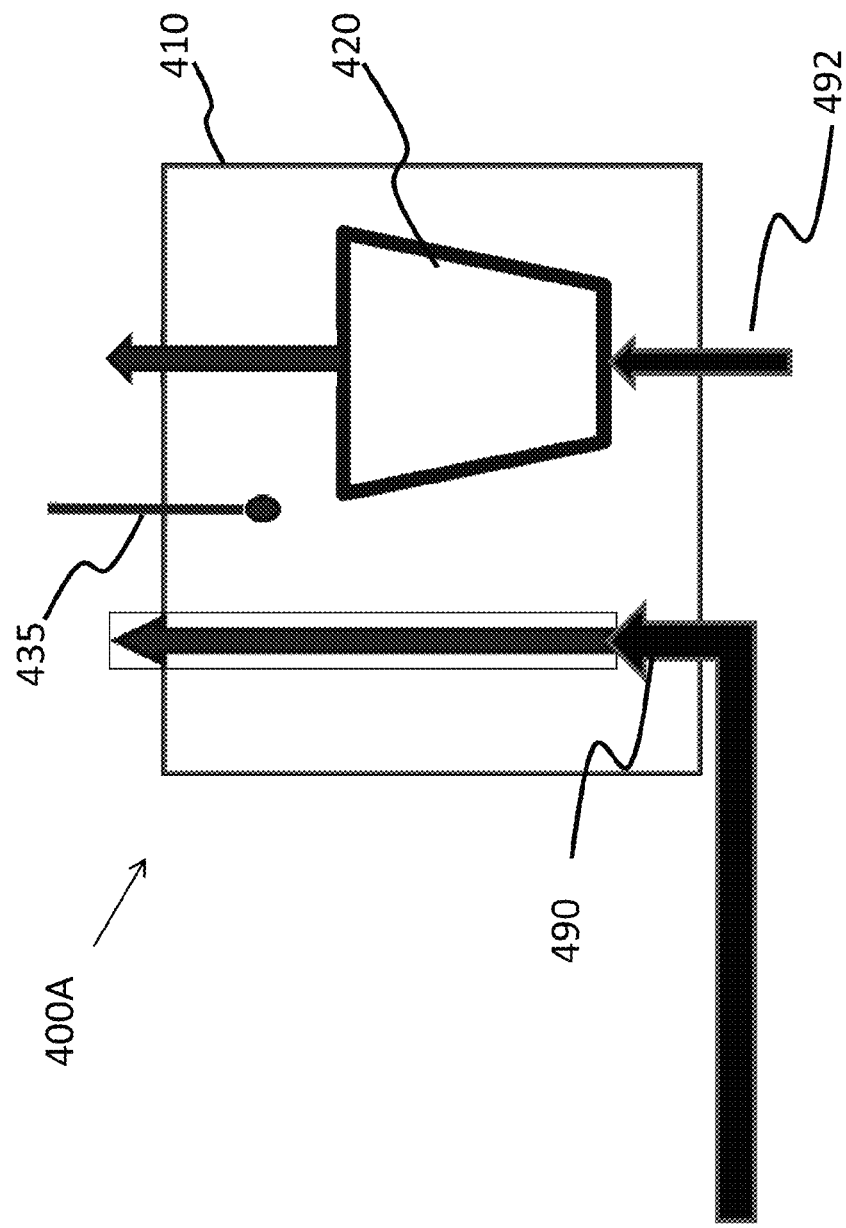

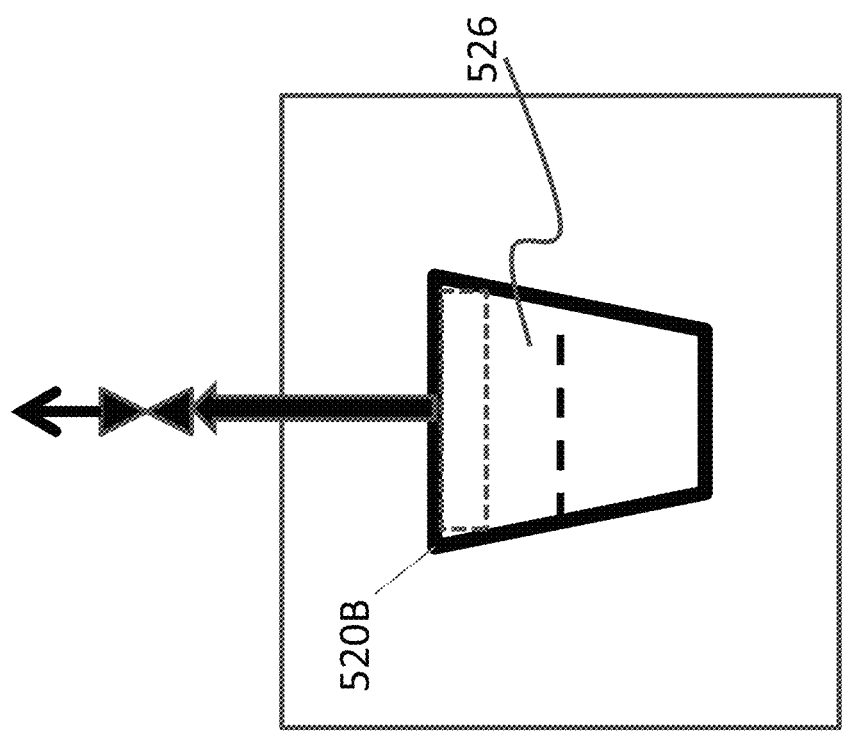

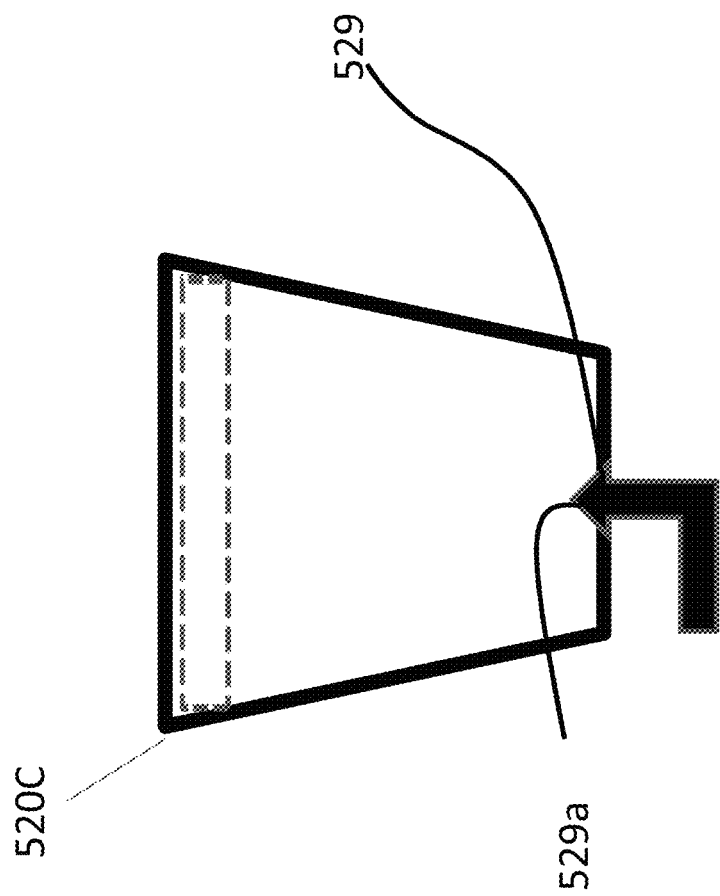

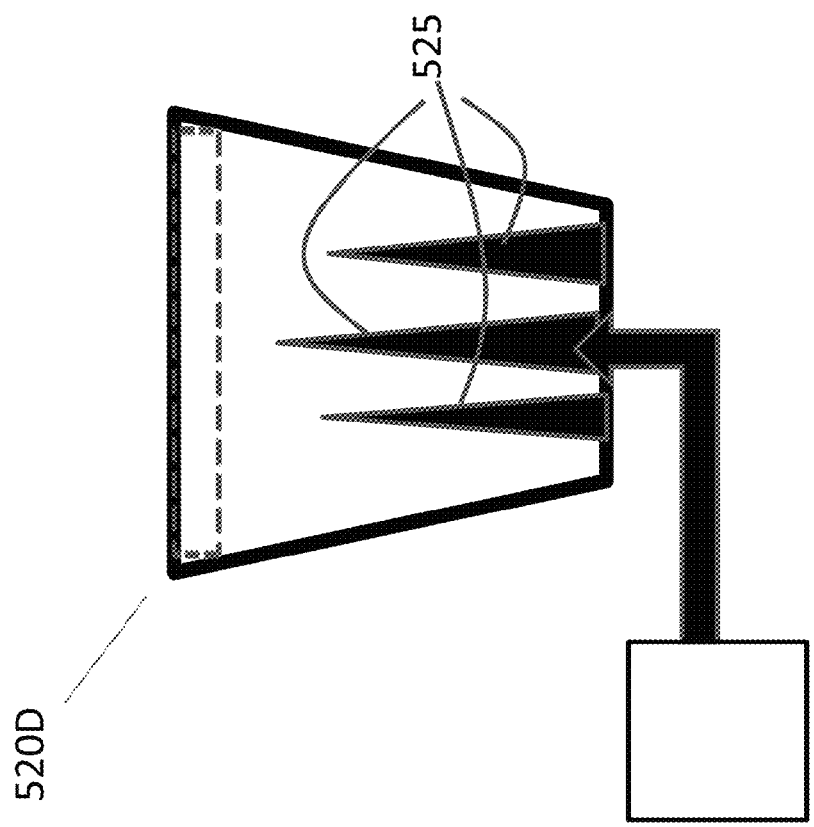

RAPID HIGH-PRESSURE MICROWAVE THERMAL DECOMPOSITION SYSTEM, CAPSULE AND METHOD FOR USING SAME

CROSS REFERENCE TO RELATED APPLICATIONS

This application claims the benefit of U.S. Provisional Patent Application No. 61/931,720, filed Jan. 27, 2014, which is incorporated by reference in its entirety.

BACKGROUND OF THE INVENTION

1. Field of the Invention

The invention is directed to the production of carbon dioxide under pressure, for beverages and the like, by thermal decomposition of various starting materials utilizing radio frequency (RF) energy.

2. Description of the Prior Art

Various methods and apparatuses for using microwaves to effect thermal decomposition are known in the prior art. Representative examples include WO 2013/070095 which describes a microwave heating or reaction apparatus for use for example in pyrolysis of organic waste. EP 343 673 A1 describes a process for the manufacture of extra light soda, in which sodium carbonate is treated with microwave energy. The prior art has not disclosed a method or apparatus for production of carbon dioxide using microwave thermal decomposition.

SUMMARY OF THE INVENTION

In one aspect the invention is a thermal decomposition system comprising: an RF energy generator; an RF antenna or electrode connected to the RF generator; a capsule chamber having a sealable opening adapted to receive and retain at least one capsule comprising a thermally decomposable material and to withstand a defined pressure evolving in the capsule; and at least one channel having a first end opened to the capsule and a second end connected to a pressure valve. Thus, application of RF energy to the thermally decomposable material in the capsule causes thermal decomposition which evolves gas.

In specific embodiments, the invention is a thermal decomposition system for carbon dioxide production (and corresponding method) comprising: a microwave generator; a microwave antenna connected to the microwave generator; a capsule containing sodium bicarbonate; a capsule chamber having a sealable opening adapted to receive and retain the capsule and to withstand a defined pressure evolving in the capsule; and at least one channel having a first end opened to the capsule and a second end connected to a pressure valve; wherein the microwave generator generates microwave energy applied to the capsule sufficient to cause thermal decomposition of the sodium bicarbonate to evolve carbon dioxide.

In another aspect, the invention is directed to a capsule for a thermal decomposition system, comprising a shell enclosing a cavity, and at least a first compartment in said cavity containing a thermally decomposable material. In embodiments, the capsule further comprises a filter to prevent the thermally decomposable material and byproducts of thermal decomposition from being expelled from the capsule during thermal decomposition of the material.

In another aspect, the invention is a method for producing carbon dioxide which comprises providing an RF energy generator and an RF antenna or electrode connected to the microwave generator and enclosing in a capsule in a capsule chamber a thermally decomposable starting material that evolves carbon dioxide upon thermal decomposition. The capsule chamber has a sealable opening adapted to receive the capsule, and the capsule is adapted to withstand a predetermined pressure evolved during the thermal decomposition. A channel is provided having a first end opened to the capsule and a second end connected to a pressure valve. Radio frequency energy is generated with the RF energy generator to heat the thermally decomposable material and evolve carbon dioxide under pressure.

In another aspect, the invention involves modelling the thermodynamics of thermal decomposition using both theoretical microwave power absorption coefficients and empirical results to obtain an optimal sodium bicarbonate:water ratio for a given mass of sodium bicarbonate and microwave frequency. From these data, system elements are developed to yield maximum carbon dioxide extraction from the thermal decomposition process in the minimum amount of time.

Embodiments of the present invention provide a unique rapid heating system, composed of a radio frequency power source and a custom designed cavity. The system is designed for heating thermally decomposable materials, such as sodium bicarbonate powder, at a high pressure to extract carbon dioxide efficiently and rapidly.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 1A, 1B, 1C and 1D are schematic illustrations of thermal decomposition systems according to some embodiments of the present invention;

FIGS. 2A and 2B are schematic illustrations of other embodiments of a thermal decomposition system.

FIG. 4A is an illustration of a system according to embodiments of the present invention for simultaneous thermal decomposition and water heating;

FIGS. 5A, 5B, 5C, 5D and 5E are exemplary illustrations of capsules according to embodiments of the present invention;

Figure 1A:
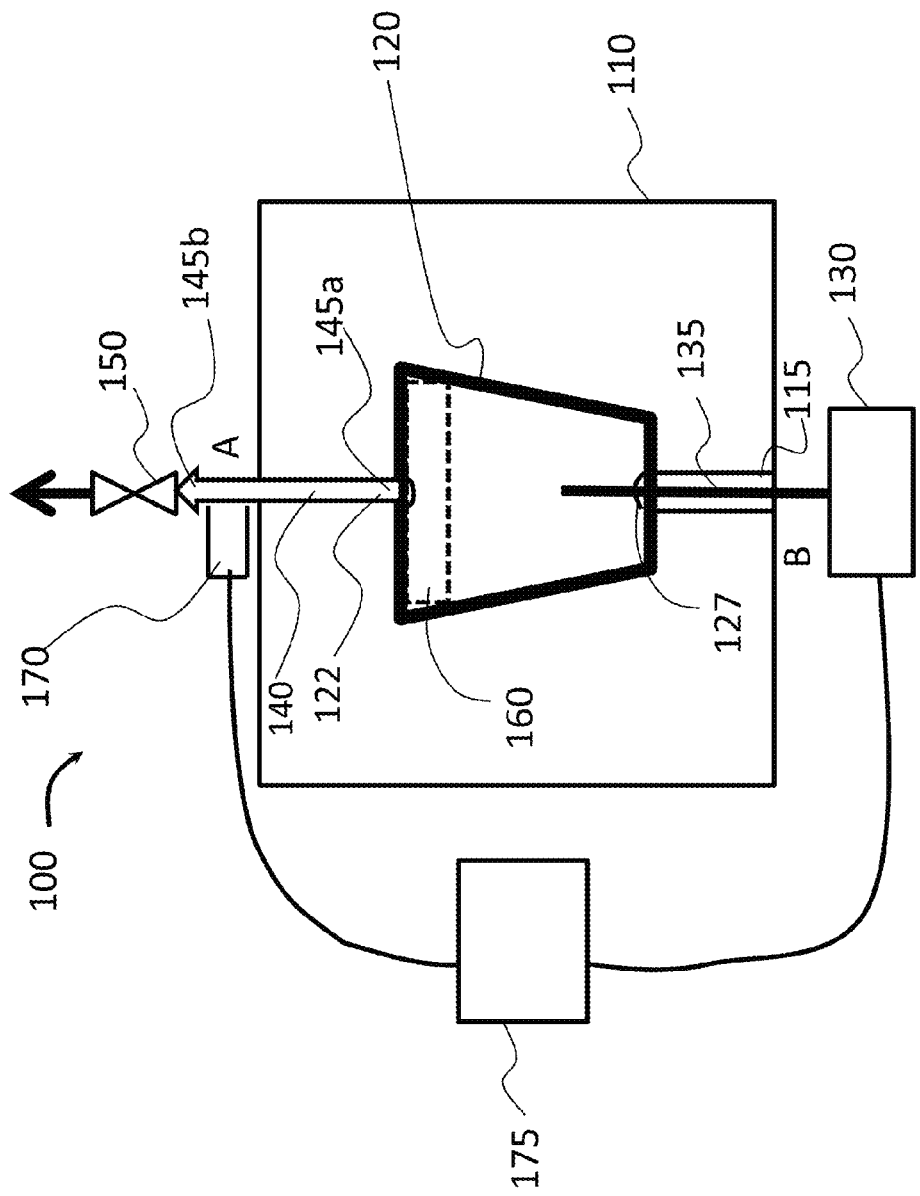

It will be appreciated that for simplicity and clarity of illustration, elements shown in the figures have not necessarily been drawn to scale. For example, the dimensions of some of the elements may be exaggerated relative to other elements

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Preferred embodiments according to the invention utilize RF energy with a frequency of 3 KHz to 300 GHz, which also includes microwave (MW) energy, having a frequency of 300 MHz to 300 GHz. The examples herein directed to heating with MW energy should not be deemed to limit the invention. Likewise, Examples herein using commercially available MW energy producing elements, operating at frequencies of 2.4-2.5 GHz, should not be construed as limiting the invention "Wet powder" is understood to refer to a powder mixed with a liquid that absorbs MW energy. Such liquid includes without limitation water, oil, alcohol or other solvent, water-alcohol solution, etc. The wet powder may contain SBC and water, in which case the SBC powder may be partially dissolved in water. "Thermal decomposition" refers to a chemical reaction that evolves gas upon heating. Thermal decomposition includes, but is not limited to, the thermal decomposition of sodium bicarbonate to evolve carbon dioxide.

Thermal decomposition based on microwave (MW) absorption heating is a complex dynamic process. The microwave absorption dependent parameters all vary during the process and may lead to unwanted results, such as thermal runaway and deterioration of decomposition efficiency. On the other hand, maximum microwave absorption during the entire process may be achieved by prior knowledge of the variation in the main process parameters, together with control of the component ratio of the components being subjected to microwave heating energy.

In general, MW energy absorption in materials is impacted by two main mechanisms of dissipation—dielectric and ion conduction. The total dissipation component, which is the relative imaginary part of the material permittivity ($\epsilon''$) is the sum of the dielectric absorption component ($\epsilon''_d$) and the ionic dissipation absorption ($\epsilon''_c$):

$$\epsilon'' = \epsilon''_d + \epsilon''_c \qquad (1)$$

Dielectric absorption is caused by molecule dipoles which tend to rotate when introduced into the alternating electric field of MW radiation. Dielectric absorption is a function of the angular frequency of the electric field ($\omega$), molecule dipole relaxation time ($\tau$) and the difference ($\epsilon_\Delta$) between the material permittivity value at zero angular frequency to the value at infinite angular frequency:

$$\epsilon''_d = \frac{\epsilon_\Delta \omega \tau}{1 + \omega^2 \tau^2} \qquad (2)$$

The ionic conduction is caused by mobile dissolved ions which act as free charged particles which oscillate along the electric field of the MW radiation. Ionic dissipation absorption is equal to the ratio between the electrical conduction ($\sigma$) and the product of the vacuum permittivity ($\epsilon_0$) and electric field angular frequency:

$$\epsilon''_c = \frac{\sigma}{\epsilon_0 \omega} \qquad (3)$$

Both mechanisms contribute to object heating as a result of dipole movement and intermolecular friction forces. The heating power density (P) absorbed in the material depends on the average electric field intensity (E), material total dissipation ($\epsilon_0 \epsilon''$) and electric field angular frequency ($\omega$):

$$P = \omega \epsilon_0 \epsilon'' E^2 \qquad (4)$$

Figure 8:
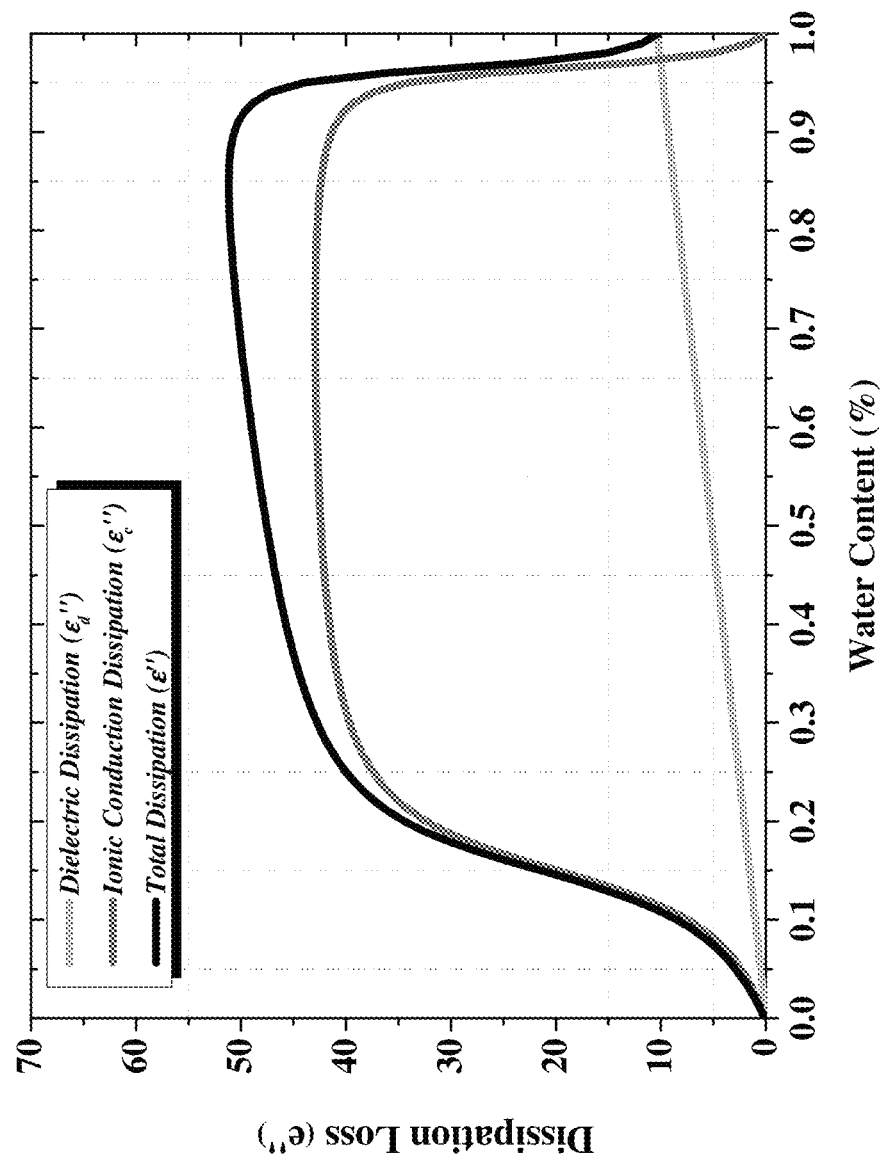
FIG. 8 is a graphic showing sodium bicarbonate solution microwave dissipation as a function of water content for fixed microwave frequency.

MW absorption varies strongly during the thermal decomposition process, due to the changes in material temperature, number of dipoles (water content) and ion concentration. Using the sodium bicarbonate ("SBC")-water system as an example, FIG. 8 illustrates the dependence of the total dissipation of ionic solution as a function of temperature and ionic concentration at fixed MW frequency.

A system according to embodiments of the present invention, utilizes dielectric heating to heat the target material (e.g. wet SBC powder) above 150° C., a temperature range at which efficient thermal decomposition takes place. Above 50° C., sodium bicarbonate ($NaHCO_3$) transforms into 63.1% sodium carbonate ($Na_2CO_3$), 10.7% water ($H_2O$) and 26.2% carbon dioxide ($CO_2$), by mass. The reaction rate increases exponentially with temperature, and is optimal in terms of decomposition rate around 200° C., where more than 90% of the original material is decomposed within one minute. At higher temperatures additional processes set in, and carbon dioxide production decreases.

Using an electromagnetic field simulation software, a microwave cavity was designed with compact dimensions compared to a typical microwave. In this design, the position and geometry of the reaction chamber were optimized to reduce reflections back into the microwave generator (e.g. magnetron) source and to obtain homogeneous heating across the chamber.

Optimizing MW radiation absorption was achieved by focusing performance on heating wet powder, allowing the liquid in the powder to generate and convey heat across the powder in the chamber as efficiently as possible. It was discovered that when the water molecules transform state from liquid to vapor, the efficiency of heating of the powder drops. To keep the absorption of microwaves in the cavity high even at temperatures above 100° C., the container was sealed in a pressure tight manner during heating and thus the water was kept in a liquid state. This enables an efficient transfer of heat between the water and powder, and reduces water loss substantially.

The magnetron was tightly mounted on the microwave cavity, to eliminate microwave energy radiation from leaking out. The system that was developed and used during the measuring of the performance of the system and method according to embodiments of the present invention complies with radiation safety regulations when operated with a standard 1 kW magnetron.

The microwave cavity was characterized using an electromagnetic field simulator, and using the Agilent 5230A network analyzer.

In the simulator, the reflection coefficient $S_{11}$ in the frequency range 2.4-2.5 GHz for a water filled reaction chamber was extracted (the dielectric function of SBC at these frequencies is unknown). Since there is no leakage from the system and since there is no absorption in other parts of the system, the amount of power absorbed may be directly calculated from the reflection coefficient. To keep the magnetron from damage and long-term deterioration, it is advised to keep the reflected power below 5%. In the tested design, the reflected power was in the range of 1-3% within the uncertainty range of the magnetron frequency (2.4-2.5 GHz).

The device was experimentally tested at low power using a network analyzer (Agilent 5230A), measuring the reflection coefficient $S_{11}$ in the 2-3 GHz frequency range. An antenna with geometry and dimensions similar to a standard commercial microwave oven antenna was manufactured, and connected to the network analyzer through a 50Ω transmission line.

In another aspect the invention is directed to a model for highly efficient thermal MW decomposition of SBC process substrate to produce carbon dioxide ($CO_2$). This model may be used to specify capsule contents, apparatus elements and process parameters to control carbon dioxide production.

The thermal decomposition reaction of SBC is represented by:

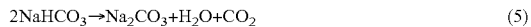

$$2NaHCO_3 \rightarrow Na_2CO_3 + H_2O + CO_2 \qquad (5)$$

SBC in solid or powder form has almost no MW absorption property ($\in''<10^{-2}$) and MW alone will not decompose the substrate. Adding water to the substrate dramatically increases MW absorption, due to added dipoles and dissolved ions, but also decreases the efficiency of substrate decomposition because more MW energy is dissipated on heating water instead of substrate.

A semi-empirical physical model based on both theoretical MW power absorption coefficients and empirical results relates the thermodynamics of the thermal decomposition to provide an initial value of SBC:water ratio for each SBC given mass and MW frequency to achieve maximum gas extraction from the thermal decomposition process in the minimum time.

As mentioned above, MW absorption for fixed MW frequency and given initial temperature is dependent on water content of the SBC solution. Low water content (<20%) has low dielectric and ionic absorption due to low dipoles concentration and low ion mobility respectively. While at high water content (>90%) the dielectric reaches a maximum, the ion concentration is negligible. As a result, maximum absorption values can be found at a water content corresponding to highly concentrated solution. MW absorption as a function of water content presented in FIG. 8.

During MW thermal decomposition many thermodynamic properties of the SBC solution change rapidly. Heating the solution from 20° C. to 100° C. more than doubles SBC solubility and ionic dissipation becomes the dominant mode of MW absorption. $CO_2$ extraction rate increases by three orders of magnitude. Thus, decomposition rate is very sensitive to temperature, and to decrease the overall process time, it is crucial to reach the maximum temperature possible.

The thermal energy (Q) needed to heat solution to a desired temperature (on the order of 150° C.), is the sum of the heat energies of the solution components (SBC and water).

$$Q = m_{SBC} C_p^{SBC} \Delta T + m_w C_p^w \Delta T + m_w Q_L \qquad (6)$$

where $m_{SBC}$ and $m_w$ are the masses of SBC and the water respectively; $C_c^{SBC}$ and $C_p^w$ are the specific heat capacities of SBC and water, respectively; $\Delta T$ is the temperature difference; and $Q_L$ is the latent heat of vaporization of water. The theoretical estimate for the process total time duration (t) is the quotient of thermal energy needed by the absorbed power.

$$t = \frac{Q}{P} \qquad (7)$$

Figure 9:
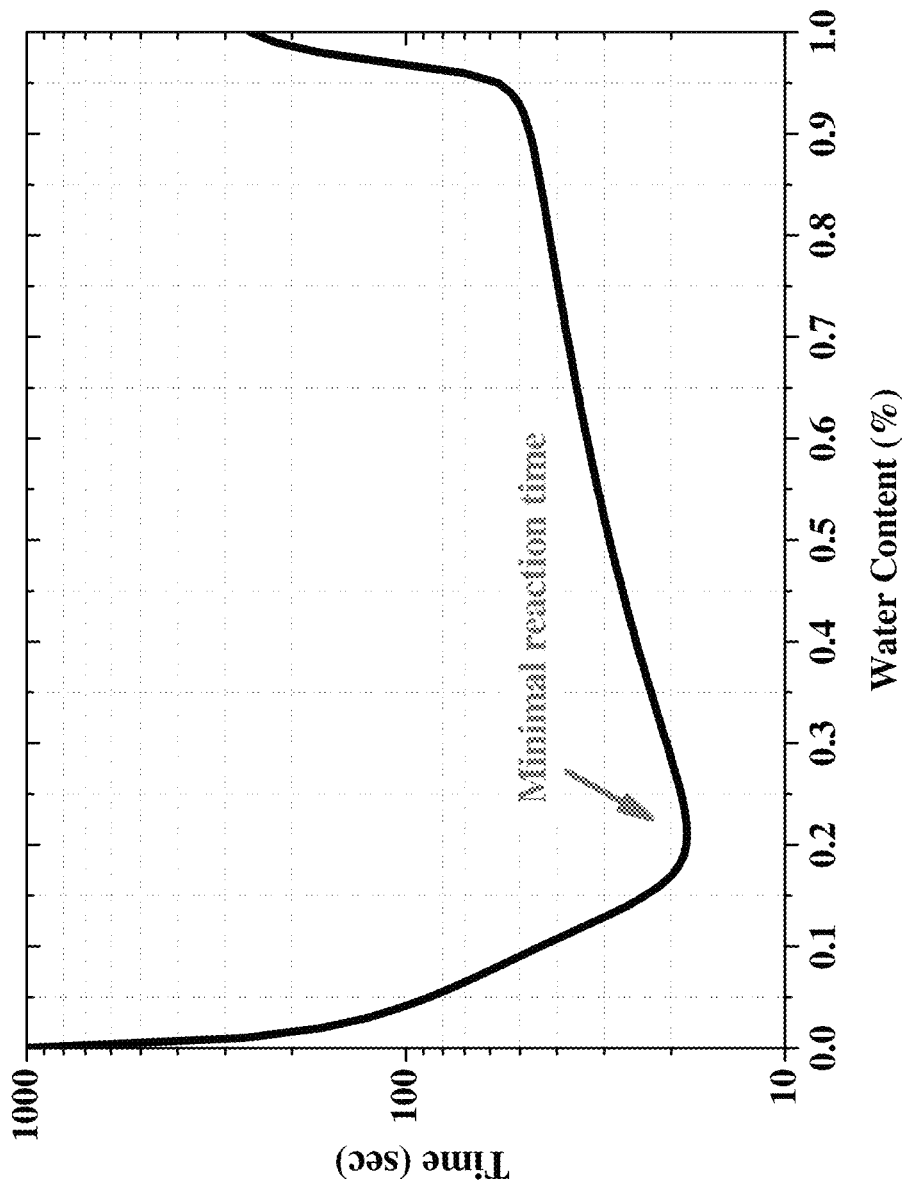
FIG. 9 is a graphic showing reaction time as a function of water content for the thermal decomposition of sodium bicarbonate in the range of 20° C. to 150° C.

This time duration has a dependence on water content, increasing mainly at low and high water content values, because of relative weak solution MW absorption (FIG. 9).

Initial water content in the capsule is important as it determines the water balance throughout the remainder of the dynamic process. Presence of excess water in the heated solution may be detrimental to the reaction, causing a decrease in MW absorption by concentrating absorption on the water fraction of the solution and unwanted cooling resulting from the formation of steam and/or convection flow inside the solution. At the same time, low water content will affect process efficiency, impacting ion mobility and preventing thermal energy reaching dry areas of SBC.

Reference is now made to FIGS. 1A and 1B which are schematic illustrations of thermal decomposition system 100 and a partial view 100A of system 100 focusing on the capsule chamber 110, respectively. Thermal decomposition system 100 may comprise microwave generator 130; microwave antenna 135 connected to microwave generator 130 and capsule chamber 110.

Capsule chamber 110 may have a sealable opening (not shown) adapted to receive and hermetically retain at least one capsule 120. According to some embodiments of the present invention, capsule 120 may comprise a thermally decomposable gas source, such as SBC, zeolite and any other materials that evolve $CO_2$ upon thermal decomposition. According to some embodiments, the thermally decomposable material may be in a powder form. According to other embodiments, thermally decomposable material may be in a wet powder form. According to yet other embodiments, the wet powder may be a mixture or a composition of 65%-85% thermally decomposable material such as SBC, and 35%-15% water. According to some embodiments, the thermally decomposable material to water ratio may be 3 to 1.

According to some embodiments of the present invention, capsule chamber 110 may withstand, when it is sealed, a defined pressure, for example, of 20 bar, evolving in capsule 120 during operation of system 100. According to some embodiments, capsule chamber 110 may provide mechanical support to the outer shell of capsule 120 to prevent rupture of capsule 120 during operation of system 100 due to the evolving pressure within System 100 may further comprise at least one channel 140. According to some embodiments channel 140 may have a first end 145a opened to said capsule and a second end 145b connected to a pressure valve 150.

According to some embodiments of the present invention capsule 120 may be a disposable thin metal capsule 120. According to alternative embodiments, capsule chamber 110 may be made of an electrically non-conducting material, virtually transparent to RF energy, which is understood to mean that the material blocks less than 1% of RF energy in the microwave frequency range.

According to some embodiments, when capsule 120 is inserted into capsule chamber 110, capsule 120 may come into electrical contact with microwave antenna 135. It should be appreciated by those skilled in the art that when capsule 120 is made of metal, capsule 120 may become a disposable microwave cavity when in contact with antenna 135 and when RF energy, such as microwave energy, is generated through antenna 135 to capsule 120. According to other embodiments of the present invention, capsule 120 may comprise a socket 127. Microwave antenna 135 may penetrate, according to some embodiments, through socket 127 into the internal cavity of capsule 120. According to other embodiments, microwave antenna 135 may be moveable within the internal cavity of capsule 120 along at least two axes of a Cartesian coordinate system. It should be appreciated that antenna 135 may be moved during operation of system 100 in order to create a homogenous heat distribution within capsule chamber 110. It should be further appreciated that when capsule chamber 110 and capsule 120 have relatively small dimensions, even heat distribution may be achieved without moving antenna 135. The term "relatively small" in this case relates to dimensions where the temperature of the contents of the chamber has reached a desired level across at least most of the content's volume within a defined time period. According to some embodiments, chamber 110 may be movable with respect to antenna 135. Antenna 135 may further comprise at least one microwave energy-concentrating element such as sharpened tip to provide very high density electric field, which may further contribute to the heat build-up. According to some embodiments, the energy-concentrating element may be adapted to penetrate into capsule 120 through one or more faces of capsule 120, when capsule 120 is inserted into capsule chamber 110.

System 100 may further comprise a pressure transducer 170 to measure and provide indication of the pressure in internal tube or channel 140. According to some embodiments, pressure transducer 170 may be connected to or in communication with a control circuit 175 and may transmit to control circuit 175 data regarding the pressure in chamber 110 substantially in real time.

According to some embodiments, control circuit 175 may be connected to or in communication with microwave generator 130 to control microwave energy by, for example, controlling the frequency generated by generator 130, based on the data received from meter 170 and, optionally, based also on pre-stored energy absorption behavior curves for several types of decomposable materials, of several sizes and/or materials of capsules, etc.

According to some embodiments, capsule chamber 110 may be made of metal or may have a metal envelope so that capsule chamber 110 may act as a microwave cavity. According to some embodiments, capsule chamber 110 may comprise a microwave cavity and may be partially filled with a dielectric material.

The microwave cavity may be made of thick aluminum walls, and may be partially filled with a material substantially transparent to RF energy, such as without limitation Teflon™ (polytetrafluoroethylene), leaving sufficient working space of the microwave cavity. The inner microwave cavity dimensions according to one embodiment of the present invention may be 100×60×60 mm in size (360 ml). According to other embodiments, smaller dimensions of microwave cavity may be used. According to some embodiments microwave cavity in capsule chamber 110 may be a high-pressure chamber.

Reference is made to FIG. 1C, which schematically depicts high pressure chamber 100B made of a dielectric material and capsule 121B made of metallic material and FIG. 1D, which depicts chamber 100C of dielectric material with a chamber inner case made of metal and capsule 121C made of dielectric material. It may be realized that chamber 110 may be made of a dielectric material while capsule 120 may be made of a metal and act as a microwave cavity, while according to other embodiments, capsule 120 may be made of a dielectric material and chamber 110 may be made of metal and act as a microwave cavity. With reference to FIGS. 1A and 1B, according to one embodiment the internal cavity of capsule chamber 110 may have a volume of 30-40 milliliter (ml). Capsule chamber 110 may comprise a microwave antenna slot or socket 115.

According to some embodiments of the present invention, capsule chamber 110 may be accessed for filling through side A of chamber 110 (FIG. 1A), for example for inserting a capsule, and may be sealed, for example with a cork (not shown). According to some embodiments, the cork or any other sealing means may be pressed on the Teflon through a silicone O-ring (not shown). It should be appreciated that other sealing means and methods may be used as known in the art.

According to some embodiments, gasses produced during the decomposition process in chamber 110 are vented through an inner tube or channel 140 into an external, lower pressure chamber (not shown) through pressure valve 150.

According to some embodiments of the present invention, this structure may be designed and built to withstand pressures up to 20 bar and temperatures up to 250° C. without any observed degradation.

The microwave cavity in capsule chamber 110 may be designed for operation in its lowest frequency mode, which falls, according to some embodiments, in the range of 2.4-2.5 GHz. According to some embodiments of the present invention, antenna 135 may be inserted through slot 115 in side B of the capsule chamber 110. According to some embodiments, antenna 135 may penetrate through socket 127 of capsule 120 into the internal cavity of capsule 120.

According to the embodiment depicted in FIG. 1B antenna 135 may not penetrate into capsule 120 but may come into close proximity to one face 121a of capsule 120. According to some embodiments, face 121a of capsule 120 proximal to antenna 135 may be made of a dielectric material, virtually transparent to microwave energy. According to some embodiments, the remaining faces of capsule 120 may be made of a metallic material.

According to some embodiments, the entire outer skin 121 of capsule 120 may be made of a metallic material. According to this embodiment, antenna 135 may come into electric contact with the metallic skin 121 of capsule 120, so that skin 121 of capsule 120 may act as a microwave antenna.

Due to uncertainties in the dielectric constant of the wet powder in capsule 120 and the frequency of microwave generator 130, and due to the variations of the dielectric constant at varying temperatures, one or more tuning means may be exercised, as is known in the art, to enable optimization of the working point (e.g. microwave frequency, location of the antenna in the microwave cavity, etc.).

Figure 2A:
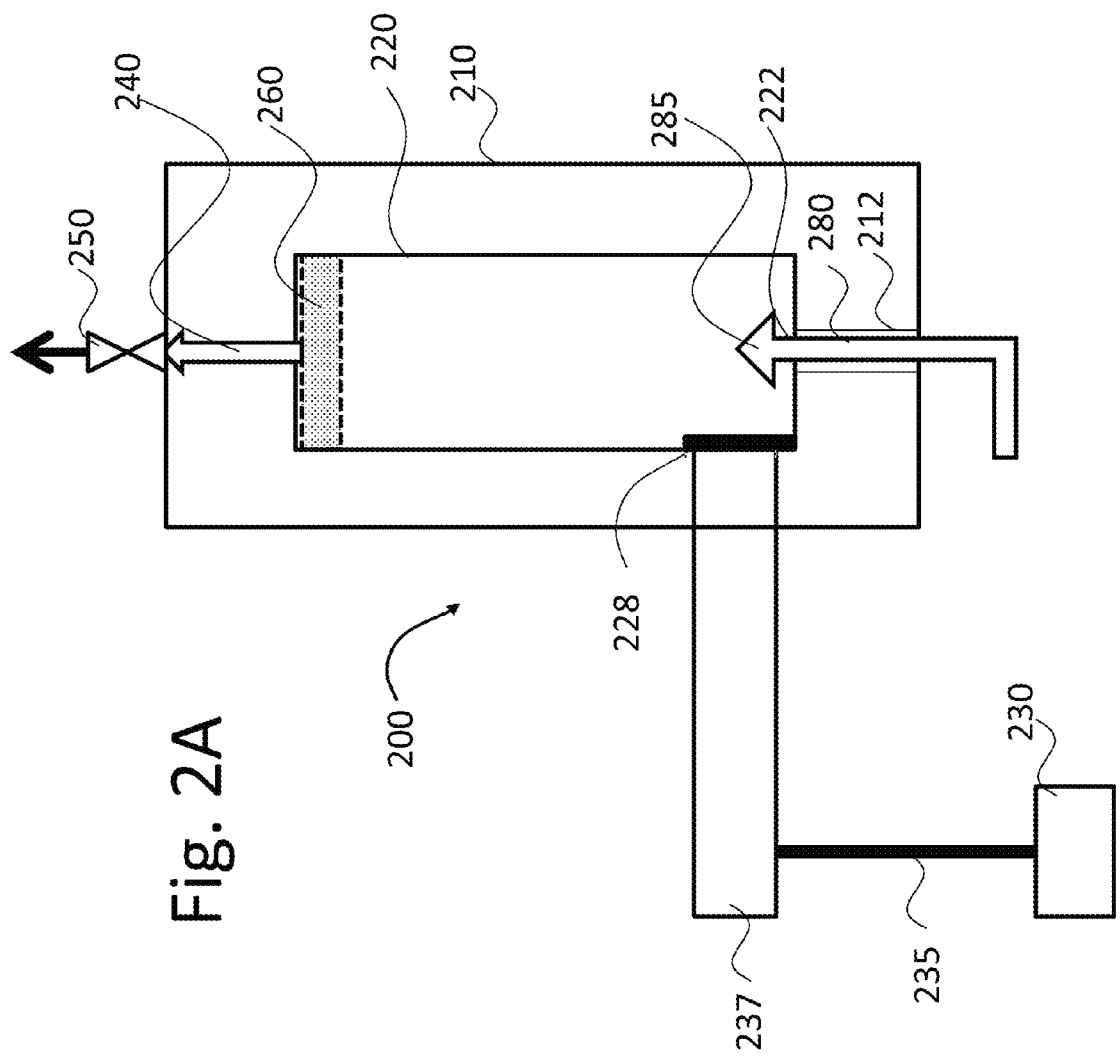

Reference is now made to FIG. 2A which illustrates a system 200 according to another embodiment of the present invention. Similar to the embodiments illustrated in FIGS. 1A and 1B, system 200 may comprise a capsule chamber 210, to receive and retain capsule 220. According to some embodiments, system 200 may further comprise microwave generator 230, for example a magnetron, microwave antenna 235 and waveguide 237 adapted to direct microwave energy from antenna 235, via capsule chamber 210 to capsule 220.

As further seen in FIG. 2A, capsule 220 may be made of metal and may have a portion 228 made of a non-conductive material, virtually transparent to RF energy.

According to some embodiments, capsule chamber 210 may have a water tube slot 212 to allow water to be inserted into capsule 220 through a water tube 280. As seen in FIG. 2A, capsule 220 may have an opening 222 to receive an outlet 285 of said water tube 280.

According to some embodiments of the present invention, capsule chamber 210 may comprise an inner tube 240 to vent product gasses, such as $CO_2$, from capsule 220 to a low pressure chamber (not shown) through pressure valve 250.

According to some embodiments of the present invention, capsule 220 may comprise a filter 260 to prevent thermally decomposable material particles from being expelled from capsule 220 to channel 240.

With reference to FIG. 2B a different arrangement for transmission of RF power to the decomposable material is presented. As seen in FIG. 2B, two metal antennas or electrodes 235a and 235b placed opposite one another are connected to an AC RF energy source 230 at one end, and to opposite sides of microwave cavity 220 at the other end. Apart from the difference in the arrangement of the RF electrodes/transmitting plates as a microwave source for chamber 220, heating device 200A operates substantially similar to heating device 200 of FIG. 2A.

Figure 3:
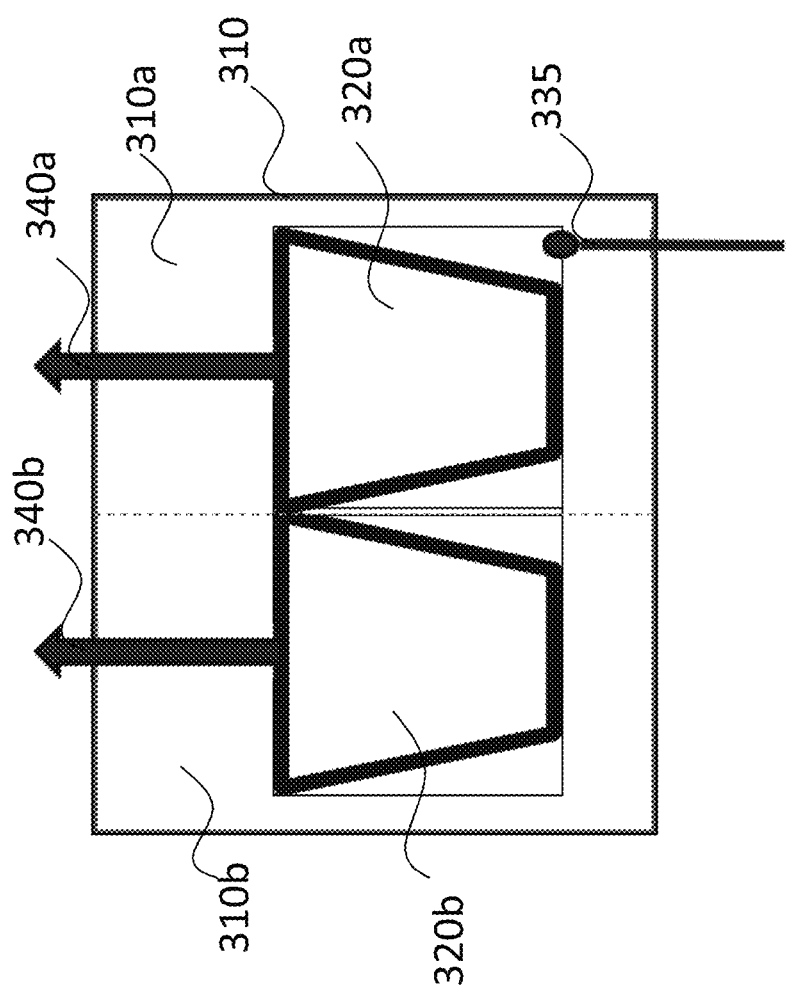
FIG. 3 is a schematic illustration of a system according to an embodiment of the present invention having a capsule chamber adapted for two capsules.

Reference is now made to FIG. 3 which is a schematic illustration of a capsule chamber 310 adapted to receive and retain two capsules 320a and 320b. As seen in FIG. 3, capsule chamber 310 may have a first area, or space 310a and a second area, or space 310b. According to some embodiments of the present invention the thermal efficiency of the microwave energy projected into capsule chamber 310 may be unevenly distributed. For example, the thermal efficiency may be tuned so as to provide more heating energy to one area, e.g. area 310a, than that provided to another area, e.g. area 310b. Thus, it should be realized that the contents of one of capsules 320a or 320b located in the more thermally efficient area of chamber 310 will be heated to a higher temperature than the contents of the other capsule 320a or 320b, in a given time interval and given similar heat coefficient for the contents of both capsules.

According to some embodiments of the present invention this uneven heating process may be utilized to produce different end products having different heating requirements in a single operation cycle of high pressure microwave thermal decomposition system (100 in FIGS. 1A and 1B). For example, a home appliance for preparing sparkling water and espresso in a single operation cycle may be realized by placing a capsule containing SBC wet powder in an area of chamber 310 where the thermal efficiency is maximal to achieve heating of the SBC wet powder to a temperature at the range of 150° C.-200° C. within 30 seconds, and placing another capsule comprising grained coffee in an area of chamber 310 where the thermal efficiency is low so that during a cycle of 30 seconds the grained coffee would not heat to a temperature over, for example, 90° C. to avoid derogating from the coffee desired characteristics. It would be appreciated that such embodiment may be used to concurrently produce other pairs of products such as carbonated water and herbal tea, carbonated water and foamed milk, sparkling beverages, sparkling yogurt and the like, simultaneously. Providing RF energy with different heating efficiency to areas 310a and 310b may be realized, according to some embodiments, by placing the RF source, e.g. antenna 335, non-symmetrically with respect to areas 310a and 310b, so that the RF induced energy received in one area—e.g. area 310a, is higher than that received in area 310b.

Reference is now made to FIG. 4A which is an embodiment of system 400A according to the present invention. As seen in FIG. 4A, capsule chamber 410 may serve as a microwave cavity for pressure heating of a substance contained in capsule 420. As further seen in FIG. 4A, capsule chamber 410 may comprise a water tube 490 passing therethrough. Water tube 490 may pass water through capsule chamber 410 and microwave antenna 435 may transmit RF energy to heat, simultaneously, both the contents of capsule 420 and water contained in tube 490. System 400A may further comprise water tube 492 adapted to penetrate into capsule 420 when it is placed inside chamber 410 and may further be adapted to provide water in order to wet the contents of capsule 420 when dry powder is used.

Figure 4B:
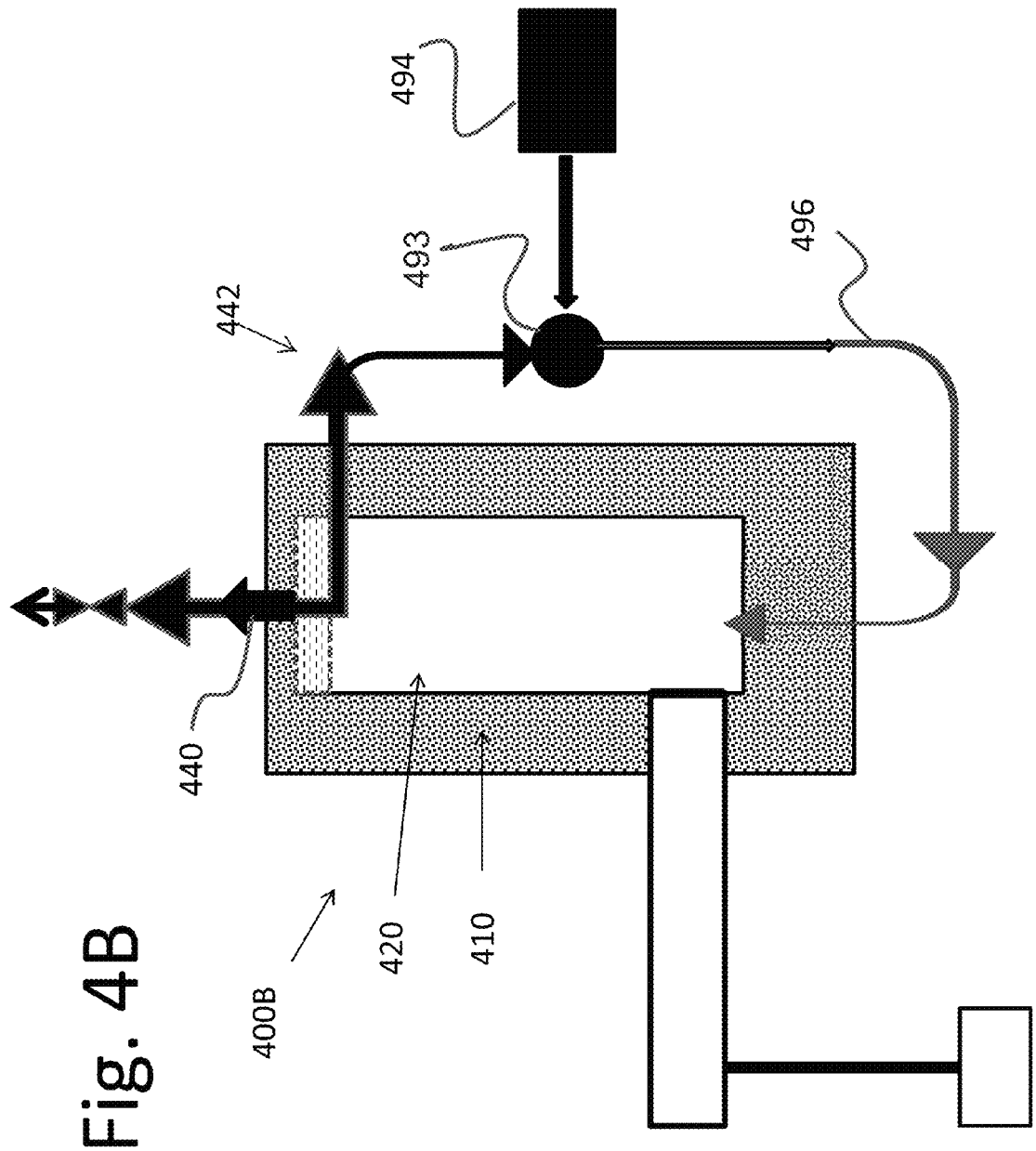
FIG. 4B is an additional illustrations of high pressure microwave thermal decomposition systems according to some embodiments of the present invention.

With reference to FIG. 4B embodiment of a system 400B is illustrated. The heating of the contents of chamber 410 may be done substantially as described with respect to FIG. 2A. As seen in the embodiment of FIG. 4B pump 493 and a water source 494 may be connected to via tubing system 496 to chamber 410, to pump vented gasses through tube 442, and water from water source 494 back to capsule chamber 410 and into capsule 420 in substantially a continuous process.

Figure 5A:
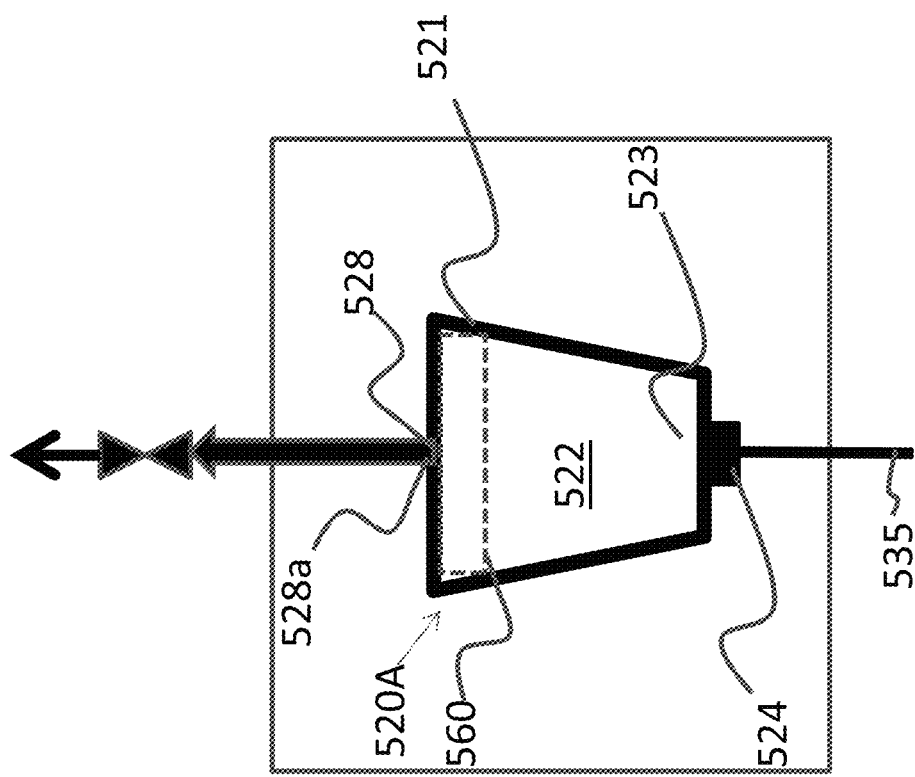
Figure 5E:
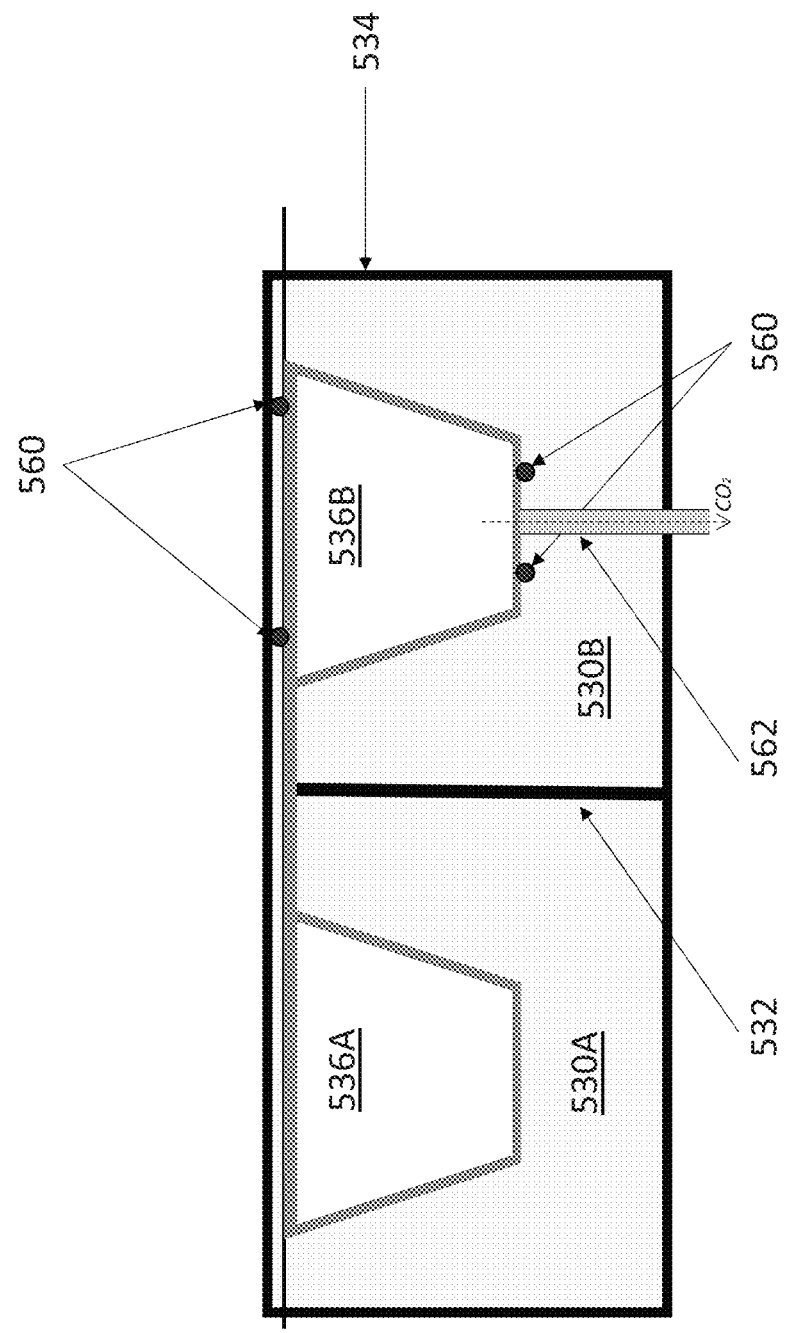

Reference is now made to FIGS. 5A, 5B, 5C, 5D and 5E which illustrate exemplary capsules 520A-520E, respectively, according to embodiments of the present invention. Capsules 520A-D may comprise a closed skin or shell 521 having an internal cavity 522 enclosed in shell 521. The capsule of FIG. 5E is a dual capsule adapted to have compartments positioned in a first area and a second area in a capsule chamber.

According to some embodiments, capsule 520 may comprise at least a first compartment 523 in cavity 522 to comprise a thermally decomposable material (not shown), and a filter 560 to prevent particles of the thermally decomposable material from being expelled from capsule 520 during thermal decomposition of the material.

According to some embodiments of the present invention, shell 521 may be made of an electrically non-conductive material, virtually transparent to RF energy. According to other embodiments, shell 521 may be made of metal. It should be appreciated by those skilled in the art that when shell 521 is made of metal shell 521 may be a microwave cavity when in contact with a microwave generator.

According to some embodiment of the present invention, capsule 520 may release carbon dioxide ($CO_2$) gas which may be released during thermal decomposition of SBC contained in a compartment of capsule 520.

According to some embodiments of the present invention, capsule 520A may comprise a socket 524 to receive microwave antenna 535.

According to alternative or additional embodiments, capsule 520D may comprise microwave energy concentrating elements 525 connected to shell 521 and protruding into cavity 522 of capsule 520.

According to some embodiments, socket 524 may be adapted to allow antenna 535 to penetrate into cavity 522 of capsule 520 when capsule 520 is inserted into thermal decomposition system (100 in FIGS. 1A and 1B).

According to some embodiments of the present invention, capsule 520B may comprise a second compartment 526 (in FIG. 5B) to contain a second substance, such as a flavoring substance.

According to some embodiments, capsule 520A may comprise an opening 528 covered by a tearable seal 528a. Opening 528 may be adapted to receive an orifice (145a in FIG. 1A) of a channel (145 in FIG. 1A) when capsule 520 is inserted into system (100 in FIG. 1A). According to some embodiments, capsule 520C may comprise another opening 529, opening 529 may be covered by tearable seal 529a. Opening 529 may be adapted to receive an outlet of a water tube (280 in FIG. 2A).

FIG. 5E depicts a dual capsule chamber arrangement which is suited to heat different starting materials to a different temperature in capsules within different areas of a capsule chamber. For example, the capsule chamber contains a first compartment 530A containing a first capsule 536A and a second compartment 530B containing a second capsule 536B. The capsules 536A and 536B are connected by a connecting piece. This configuration allows the two capsules to be located in separate areas of the capsule chamber having respective thermal efficiencies. The first area of the chamber may be separated by a wall 532 which inhibits transmission of RF energy from the first area to the second area, while the external chamber housing has metal walls 534 surrounding area 530B of high thermal efficiency.

According to some embodiments of the present invention capsule 536A contains a substance that does not get heated, such as flavoring, while capsule 536B contains the substance to be heated and thermally decomposed, preferably a wet SBC powder. The capsule is provided having top and bottom seals 560 to maintain the pressure build-up, generated due to the formation of $CO_2$, within capsule 536B only. Capsule 536B further comprises a gas exit conduit 562 at the bottom surface of the capsule to release $CO_2$.

Figure 6:
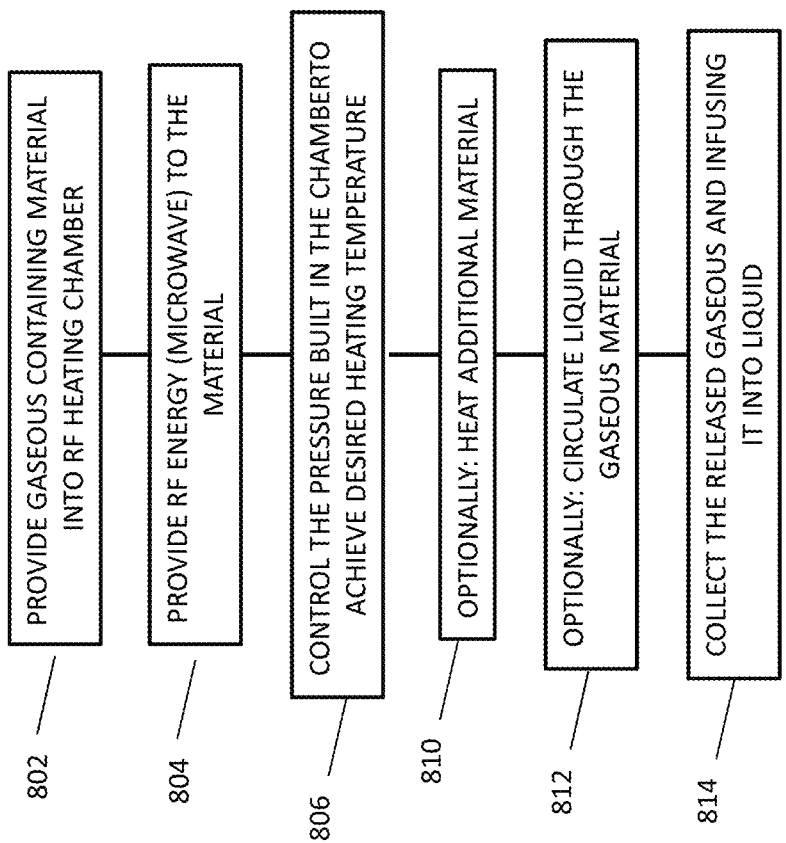
FIG. 6 is a flowchart of a method for thermal decomposition of a material according to embodiments of the present invention.
Figure 7:
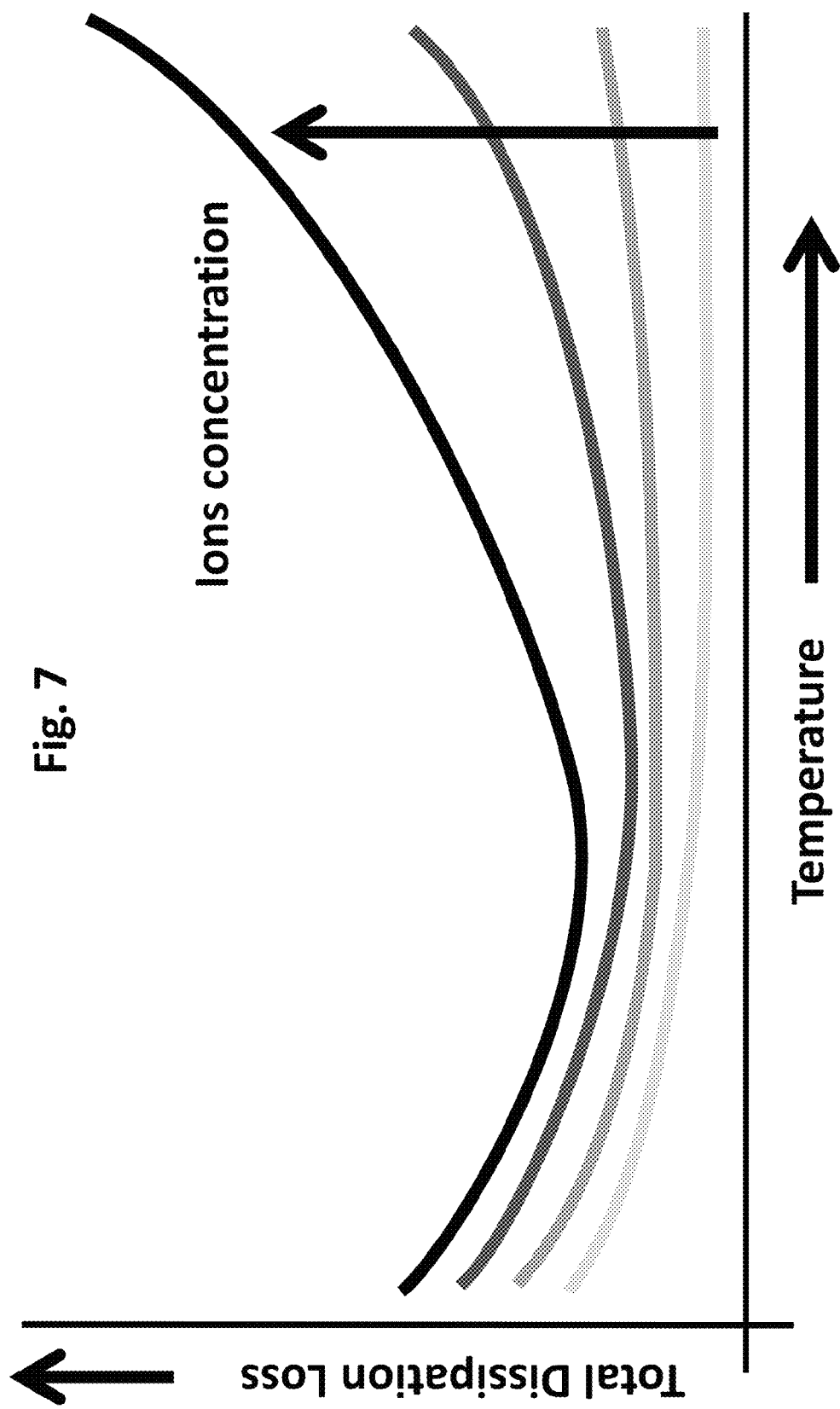
FIG. 7 is a graphic showing total dissipation of an ionic solution of sodium bicarbonate as a function of temperature and ionic concentration at fixed microwave frequency.

Reference is made to FIG. 6, which is a schematic flow chart depicting process of producing gas by heat, according to embodiments of the present invention. Material, such as sodium bicarbonate is provided (block 802) into a heating chamber. The material may be any material capable of releasing $CO_2$ upon thermal decomposition. RF energy is provided to the material in the chamber (block 804). As the pressure is built inside the chamber due to the release of $CO_2$, the pressure is controlled by a control system to set the process parameters at predefined values (block 806). According to embodiments of the present invention an additional material/liquid may be heated in the heating chamber (block 810). According to embodiments of the present invention liquid, such as water, may be circulated through the heated material to improve absorption of the released gas in the liquid (block 812). The released gas is collected and infused into a liquid reservoir to create a gaseous drink (block 814).

MW susceptor materials in the form of powder, needles and thin films may be used inside the capsule, or as a component of the capsule, to improve the efficiency of the thermal decomposition process. Susceptor materials include, without limitation, aluminum flakes, ceramics, metallized films and other materials known in the art to exhibit a rapid temperature increase in proportion to applied MW power ("susceptance"). Susceptor materials function as efficient MW absorbers both inside a cavity and in open space. Thus, adding a susceptor material inside a sodium bicarbonate-containing capsule or using a susceptor material as a capsule shell may positively increment thermal decomposition process efficiency.

Two principal configurations using MW susceptors are contemplated for use with the invention: wet capsule and dry capsule. In the wet capsule configuration, adding susceptor elements to the capsule allows for heating of SBC in the vicinity of the susceptor, although the water content inside the capsule decreases during the process—which lead to capsule cooling and a reduction in MW absorbtion (by energy and mass outflow respectively, as described above). The combination of susceptor and water together allows for much faster decomposition rate compared to a capsule containing only water and SBC, without susceptor. In the dry capsule configuration, susceptor elements placed inside the capsule absorb MW energy and contribute directly to heating the low absorbing material (such as SBC powder) to enable the thermal decomposition process.

EXAMPLE A

A system was built consisting of a small dedicated MW chamber and a conduit exiting the microwave connected to a pressure gauge. A momentary relief valve was located on the conduit with the conduit end entering a 0.5 L plastic bottle made out of polycarbonate (PC). A dedicated nozzle was located at the end of the conduit, with a pressure gauge connected to the bottle, measuring the pressure inside the bottle. A pump circulating water in and out of the plastic bottle was connected as well. The water bottle was filled with water and cooled to a temperature of 36° F.

The capsule consisted of reusable polytetrafluoroethylene (Teflon) Which was filled with 25 g of SBC mixed with 5 cc of water. The capsule was received into the microwave chamber fitting cavity. The microwave chamber was then activated, thus heating the capsule contents.

Simultaneously, the water pump was activated, mixing the water constantly. When the heat inside the MW chamber rose, the pressure gauge started rising, indicating the production/extraction of the carbon dioxide from the capsule. When the pressure inside the microwave chamber reached 15 bar, the valve was opened—allowing the gas to enter the bottle. The pressure inside the bottle rose (indicated by readings from the connected gauge). The water circulation caused the gas to be dissolved in the water, thus lowering the pressure inside the bottle.

The process was repeated several times—releasing pulses of carbon dioxide into the bottle and mixing them—until the pressure inside the microwave chamber stopped rising, indicating all the gas contained in the sodium bicarbonate was released. The full operation duration did not exceed 1 minute.

The soda created inside the bottle was measured using an ICI tester, indicating the GV (Gas Volume) level reached 4.2.

EXAMPLE B

The system of Example A was used for an additional set of experiments, utilizing the same capsule housing but a different ratio of sodium bicarbonate and water (24 g of obtained Sodium Bicarbonate mixed with 5.5 cc of water), and drawing gas in a continuous rather than pulsed sequence.

The water inside the water bottle was cooled to a temperature of 36° F., and the pump was activated to circulate the water inside the bottle. The microwave chamber was then activated, and once the pressure inside the chamber rose to 20bar—the valve was opened, and held open for 40 seconds. The soda created inside the bottle was measured using an ICI tester, indicating the GV (Gas Volume) level reached 3.1.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention. Further, the embodiments disclosed herein are related, so that features and dependent limitations disclosed in the specification in connection with one embodiment or one independent claim may also be combined with another embodiment or another independent claim, without departing from the scope of the invention.

What is claimed is:

1. A thermal decomposition system for carbon dioxide production, comprising:
    a microwave generator;
    a microwave antenna connected to said microwave generator;
    a capsule containing sodium bicarbonate;
    a capsule chamber having a sealable opening adapted to receive and retain the at least one capsule and to withstand a defined pressure evolving in the at least one capsule;
    at least one channel, said channel having a first end opened to said capsule and a second end connected to a pressure valve; wherein
    the microwave generator configured to generate microwave energy applied to said capsule sufficient to cause thermal decomposition of said sodium bicarbonate to evolve carbon dioxide.

2. The thermal decomposition system according to claim 1 wherein said capsule is a disposable thin metal capsule and said capsule chamber is made of an electrically non-conducting material, virtually transparent to Radio Frequency (RF) energy; and wherein when said capsule is inserted into said capsule chamber, said capsule comes into electrical contact with said microwave antenna to become a disposable microwave cavity.

3. The thermal decomposition system according to claim 1 wherein said capsule further comprises flavoring substance, and wherein said sodium bicarbonate is contained in a first section of said capsule and said flavoring substance is contained in a second section of said capsule.

4. The thermal decomposition system according to claim 1 wherein said sodium bicarbonate is a wet powder comprising sodium bicarbonate and water.

5. The thermal decomposition system according to claim 4 wherein said wet powder comprises about 65% to about 85% by weight sodium bicarbonate and about 35% to about 15% by weight water.

6. The thermal decomposition system according to claim 1 wherein said capsule chamber is adapted to receive and retain a disposable capsule made of a non-conductive material virtually transparent to RF energy.

7. The thermal decomposition system according to claim 1 wherein said capsule further comprises a filter.

8. The thermal decomposition system according to claim 1 wherein said capsule has a socket; and said antenna is adapted to penetrate into said capsule through said socket when said capsule is inserted into said capsule chamber.

9. The thermal decomposition system according to claim 1 wherein said antenna comprises at least one microwave energy concentrating element adapted to penetrate into said capsule through one or more faces of said capsule, when said capsule is inserted into said capsule chamber.

10. The thermal decomposition system according to claim 1 wherein said capsule is a disposable capsule; wherein a portion of said capsule is made of a material, virtually transparent to radio frequency (RF) energy;
wherein another portion of said capsule is made of metal; and
wherein when said capsule is inserted into said capsule chamber, said portion of said capsule made of a material, virtually transparent to RF energy, is proximal to and directed towards said antenna.

11. The thermal decomposition system according to claim 8 wherein said antenna is movable within said capsule along at least two axes of a Cartesian coordinate system.

12. The thermal decomposition system according to claim 1 further comprising:
a pressure meter to monitor the pressure in said capsule chamber; and
a control circuit in communication with said pressure meter and with said microwave generator;
wherein said control circuit is adapted to change the frequency and/or the power of microwave energy generated by said microwave generator according to data received from said pressure meter.

13. The thermal decomposition system according to claim 1 wherein the capsule chamber has a first area and a second area; and
wherein said microwave generator has a first thermal efficiency in the first area and a second thermal efficiency in the second area, different from the first thermal efficiency;
the microwave generator controllably heating contents of the first area to a first temperature and contents of the second area to a second temperature, different from the first temperature.

14. The thermal decomposition system according to claim 13, wherein the capsule has a first compartment and a second compartment, the first compartment located in the first area of the capsule chamber and the second compartment located in the second area of the capsule chamber.

15. The thermal decomposition system according to claim 13, comprising a first capsule located in the first area of the chamber and a second capsule located in the second area of the capsule chamber.

16. The thermal decomposition system according to claim 13, further comprising a wall between the first area of the chamber and the second area of the chamber, the wall inhibiting transmission of RF energy from the first area to the second area.

17. The thermal decomposition system according to claim 1, wherein the capsule chamber comprises a shell and at least two compartments, at least one of said compartments having a metal wall.

18. The thermal decomposition system according to claim 1, comprising at least one compartment having a metal wall;
said compartment having a capsule comprising a top surface, a bottom surface, and containing thermally decomposable starting material said capsule further comprising pressure seals to maintain pressure build-up during thermal decomposition, and said bottom surface of the capsule having a gas exit conduit to release produced $CO_2$.

* * * * *